US 8,345,299 B2

(12) United States Patent
Aoki et al.

(10) Patent No.: US 8,345,299 B2
(45) Date of Patent: Jan. 1, 2013

(54) IMAGE FORMING APPARATUS AND METHOD FOR PRINTING INDEX SHEETS BY SELECTING IMAGE FILES STORED IN A PLURALITY OF DIRECTORIES

(75) Inventors: Kazuma Aoki, Kasugai (JP); Masashi Kato, Nagoya (JP); Toru Tsuzuki, Okazaki (JP); Hiroyuki Yamamoto, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1343 days.

(21) Appl. No.: 11/760,170

(22) Filed: Jun. 8, 2007

(65) Prior Publication Data

US 2007/0299750 A1    Dec. 27, 2007

(30) Foreign Application Priority Data

Jun. 27, 2006 (JP) .................................. 2006-176917

(51) Int. Cl.
*G06K 15/00* (2006.01)

(52) U.S. Cl. ...................... 358/1.18; 358/1.13; 705/26.8; 705/27.2; 715/841

(58) Field of Classification Search .................. 358/1.18, 358/1.13; 347/15; 355/40; 386/200; 705/26.8, 705/27.2; 715/744, 841; 719/331
See application file for complete search history.

(56) References Cited

U.S. PATENT DOCUMENTS

| | | | | |
|---|---|---|---|---|
| 5,289,573 A | * | 2/1994 | Kataoka et al. | 715/841 |
| 5,786,815 A | * | 7/1998 | Ford | 715/744 |
| 2003/0063198 A1 | * | 4/2003 | Yokokawa | 348/231.2 |
| 2005/0002063 A1 | * | 1/2005 | Hanamoto | 358/1.18 |
| 2005/0146740 A1 | * | 7/2005 | Fukuda | 358/1.14 |
| 2005/0195435 A1 | * | 9/2005 | Kojima et al. | 358/1.16 |
| 2006/0287974 A1 | * | 12/2006 | Mochizuki et al. | 707/1 |
| 2007/0019020 A1 | * | 1/2007 | Wakai | 347/15 |

FOREIGN PATENT DOCUMENTS

| | | |
|---|---|---|
| JP | 11-321011 A | 11/1999 |
| JP | 2002-049634 A | 2/2002 |
| JP | 2003-260847 A | 9/2003 |
| JP | 2004-268550 A | 9/2004 |
| JP | 2004-282224 A | 10/2004 |
| JP | 2005174261 | 6/2005 |
| JP | 2006-050036 A | 2/2006 |

OTHER PUBLICATIONS

Excerpts of Greg Perry, Sams Teach Yourself Microsoft® Windows® XP in 24 Hours, Sams 2002, ISBN-13: 978-0-672-32217-4.*

(Continued)

*Primary Examiner* — King Poon
*Assistant Examiner* — David S Cammack
(74) *Attorney, Agent, or Firm* — Banner & Witcoff, Ltd.

(57) ABSTRACT

An image forming apparatus that can read data from a storage medium having hierarchically structured directories includes a first directory and a second directory which is stored in the first directory. The apparatus includes: a display portion that displays designation information of the first directory; an operation portion configured to receive a designation of the second directory based on the first directory designation information displayed on the display portion; a display control portion that controls the display portion to display designation information of the second directory when the second directory is designated; and a printing portion that index-prints images on a print medium based on files stored in one of the first and second directories, the designation information of which is currently displayed on the display portion.

18 Claims, 14 Drawing Sheets

OTHER PUBLICATIONS

Excerpts of Mark Edward Soper, Easy Digital Camera, published by Que, 2004, ISBN-13: 978-0-7897-3077-0.*
Unix Commands Guide, author unattributed, dated Feb. 10, 1992. Retrieved from Internet Archive via URL: <http://web.archive.org/web/19990210082426/http://www.cs.brown.edu/courses/bridge/1998/res/UnixGuide.html>.*

JP Office Action dtd May 8, 2008, JP Appln. 2006-176917.
EP Search Report dtd Nov. 9, 2007, EP Appln. No. 07011402.0.
CN Office Action dtd Oct. 16, 2009, CN Appln. 200710127938X, English translation.

* cited by examiner

IMAGE FORMING APPARATUS AND METHOD FOR PRINTING INDEX SHEETS BY SELECTING IMAGE FILES STORED IN A PLURALITY OF DIRECTORIES

CROSS-REFERENCE TO RELATED APPLICATION

This application claims priority from Japanese Patent Application No. 2006-176917, filed on Jun. 27, 2006, the entire subject matter of which is incorporated herein by reference.

TECHNICAL FIELD

The present invention relates to an image forming apparatus which can index print images in a directory.

BACKGROUND

An image forming apparatus is designed to directly receive a storage medium (e.g., a memory card), in which photographic images or the like captured by a digital camera are stored. The apparatus can read those images stored in the storage medium and allow a user to perform a predetermined operation to select and print out a desired image from among these images without the use of a personal computer.

The storage medium having a high storage capacity adopts a so-called directory structure (tree structure) file system so that a large quantity of images classified according to user's preference is stored in corresponding directories. To print a desired image, the user wants to easily search the desired image from among the large quantity of images stored in the storage medium.

Japanese patent publication 2005-174261-A discloses an image forming apparatus for selecting a directory in which a desired image is stored. The image forming apparatus to which a storage medium having a directory file system is mounted extracts, from plural images stored in directories, index images representing respective directories, and index prints those index images as print objects together with index numbers of the directories onto a sheet. Using the index-printed sheet, the user inputs the directory number into the image forming apparatus to select the directory in which the desired image would be stored, to thereby find the desired image.

However, if the directories are arranged to have a hierarchical structure of several levels, the user faces difficulty in searching the desired image because the user may not be able to know where the directory storing the desired image therein is located in the file system, i.e., how the directories are hierarchically structured.

SUMMARY

The present invention was developed in view of the aforementioned problems.

The present invention provides, as an illustrative, non-limiting embodiment, an image forming apparatus that can read data from a storage medium having hierarchically structured directories including a first directory and a second directory which is stored in the first directory. The apparatus includes: a display portion that displays designation information of the first directory; a designation portion that designates the second directory based on the first directory designation information displayed on the display portion; a display control portion that controls the display portion to display designation information of the second directory when the second directory is designated by the designation portion; and a printing portion that index-prints images on a print medium based on files stored in one of the first and second directories, the designation information of which is currently displayed on the display portion.

As one of advantages, a user can easily designate a directory to be index printed. Other features and advantages will be discussed in detail with reference to the accompanying drawings.

DETAILED DESCRIPTION

Now, description will be made for an embodiment of the present invention with reference to FIG. 1 to FIG. 14.

1. The Entire Printer Configuration

A printer 10 (an example of an "image forming apparatus") of this embodiment has a PC printing function for receiving print data from a host computer (not shown) or the like and printing the received print data, and a direct printing function for directly reading image data stored in an external memory such as a USB memory 17 and printing the read image data. The printer 10 has the following characteristic features in relation to the direct printing function.

Figure 1:
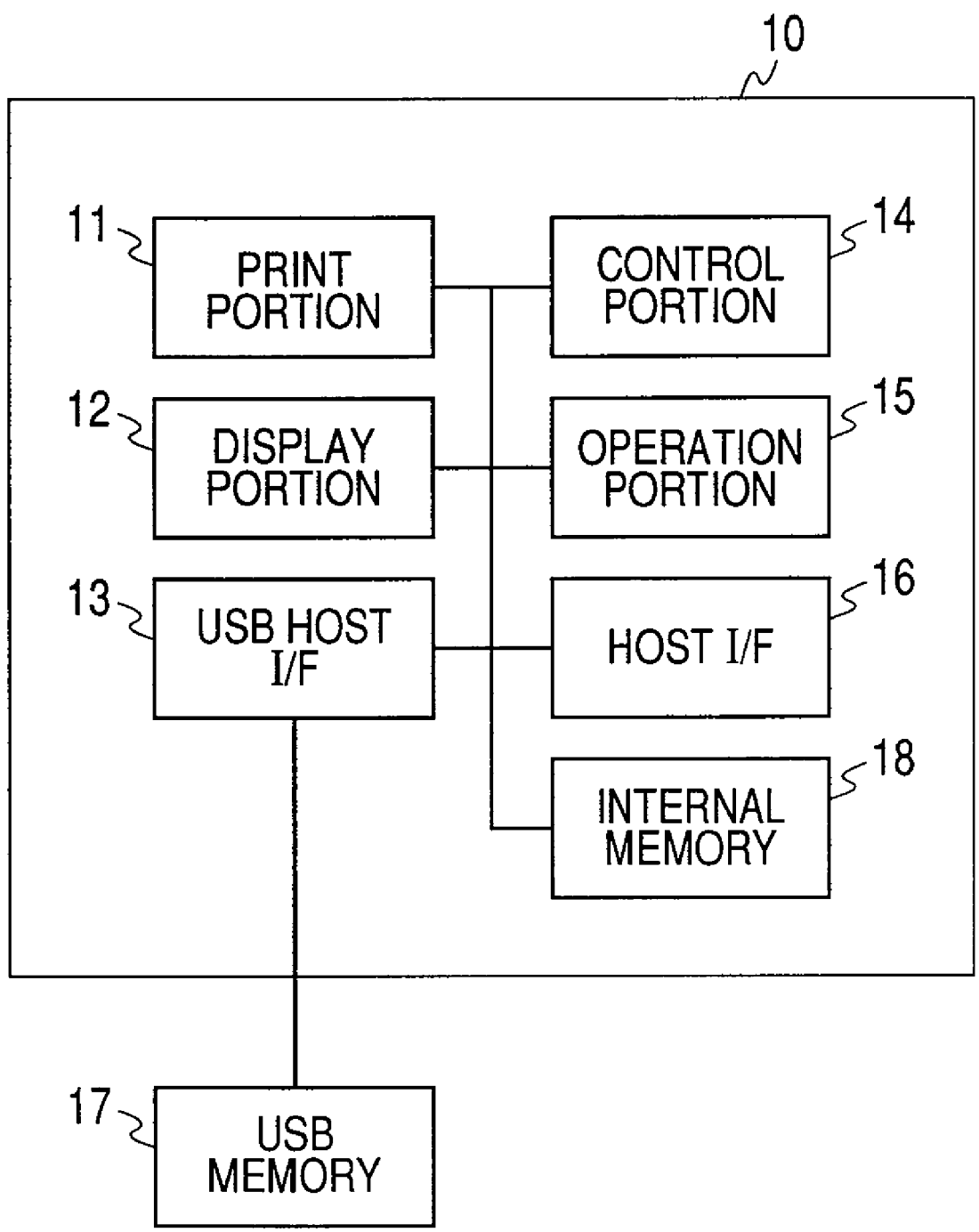
FIG. 1 is a schematic view illustrating a hardware configuration of a printer according to an embodiment of the present invention.

FIG. 1 is a schematic view illustrating the hardware configuration of the printer 10. The printer 10 includes a printing portion 11 for performing printing operations on a sheet 19 (an example of a "print medium"), a display portion 12, an USB host I/F 13, a control portion 14 (an example of a "display control portion"), an operation portion 15 operated by a user, a host I/F 16, and an internal memory 18. The internal memory 18 stores various programs such as a program for controlling the entire operation of the printer 10. The control portion 14 includes a CPU, and controls the operation of the printing portion 11 and the display portion 12 based on the programs stored in the internal memory 18. The printer 10 can communicate data with the host computer via the host I/F 16. The printer 10 can removably mount the USB memory 17 thereto and can read information from the USB memory 17 via the USB host I/F 13.

2. The Directory Structure Inside the USB Memory 17

Figure 2:
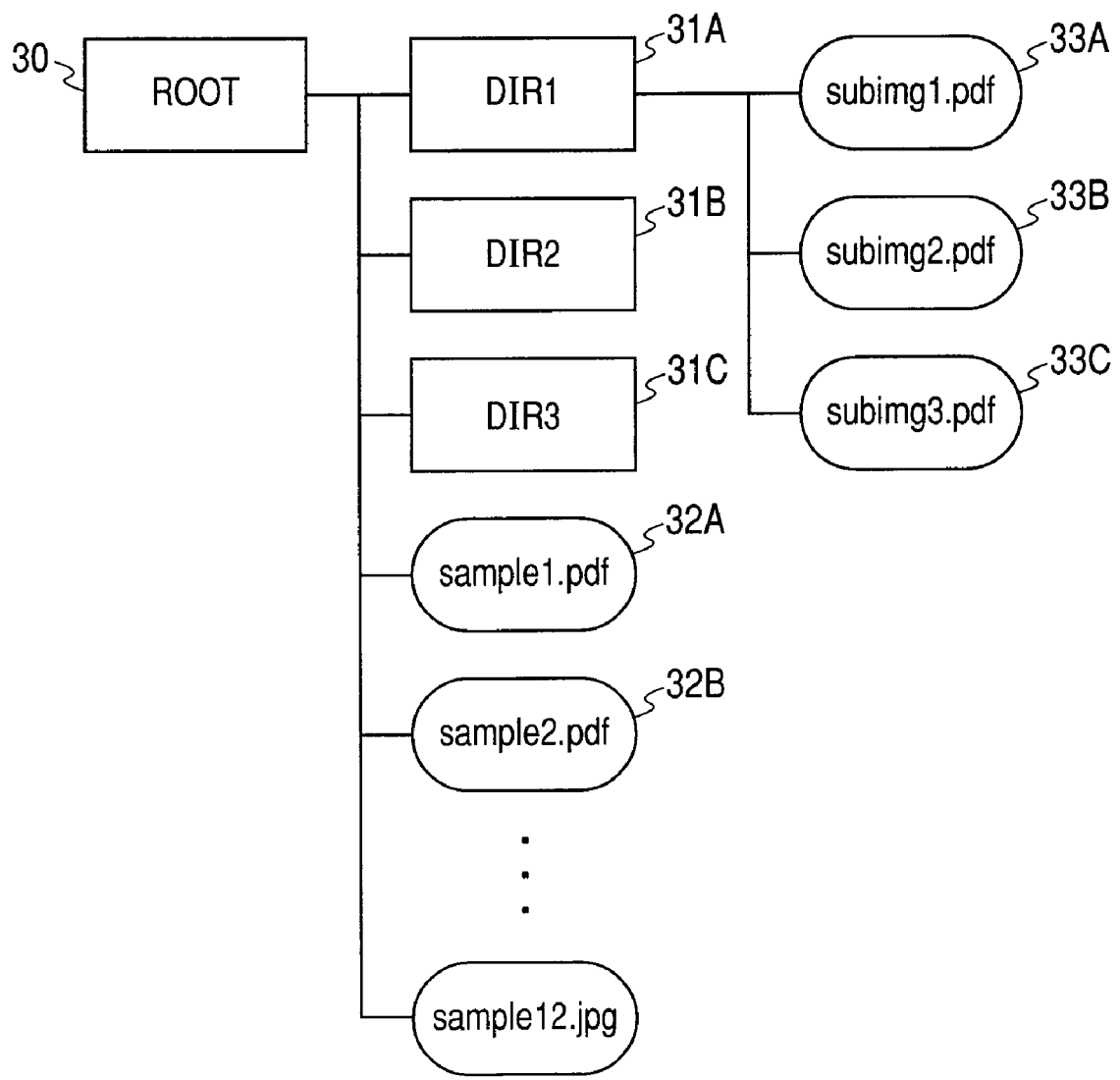
FIG. 2 is a conceptual view illustrating a directory structure in a USB memory.

FIG. 2 is a conceptual view showing an example of the directory structure inside the USB memory 17. As shown in FIG. 2, the USB memory 17 has such a tree structure file system that a plurality of directories is arranged hierarchically. Multiple pieces of image data are classified and stored in the directories created, for example, by user's preference. In this example, the uppermost directory (hereinafter referred to as the "ROOT directory 30") stores three directories (sub-directories) 31A, 31B and 31C and multiple pieces of image data 32A, 32B . . . The sub-directory 31A stores three pieces of image data 33A, 33B and 33C. Each of the sub-directories 31B and 31C in this example is an empty directory which does not store any information any information(any directories and image data) therein.

3. The Configuration of the Display Portion and the Operation Portion

Figure 3:
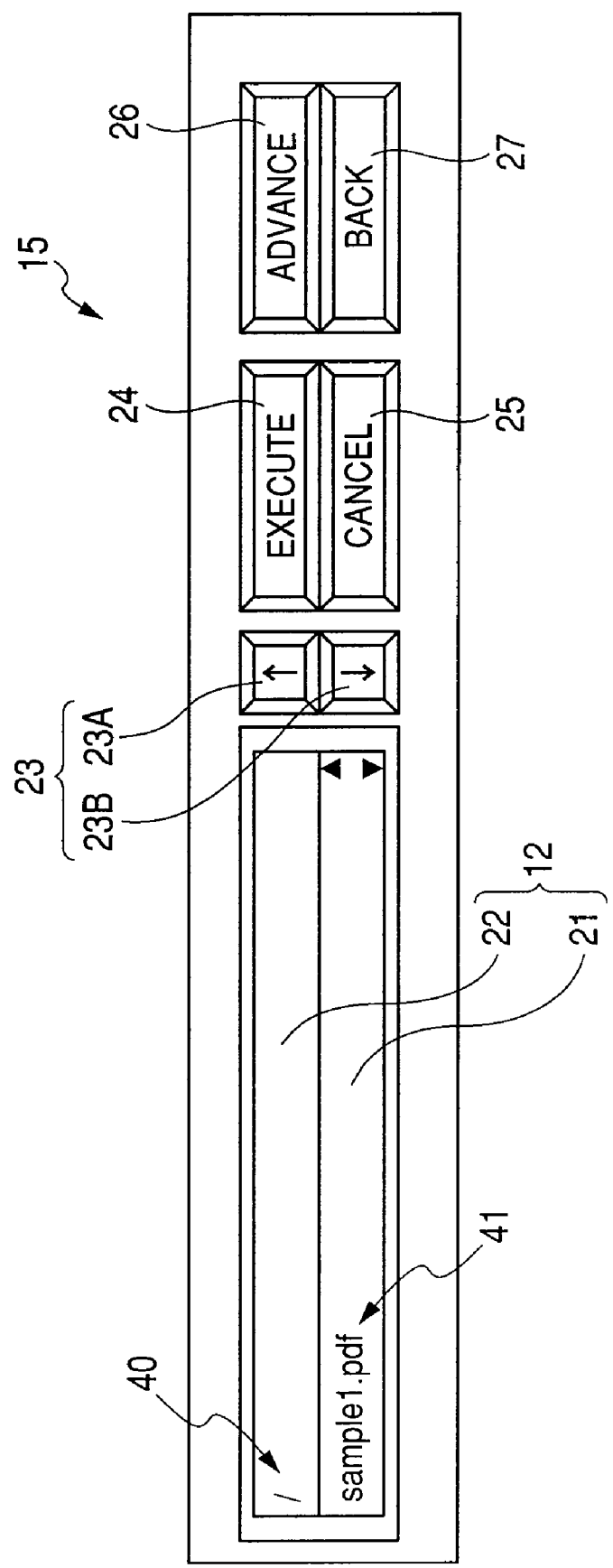
FIG. 3 is a schematic view illustrating an operation portion and a display portion disposed on a surface of a body case of the printer.

FIG. 3 is a schematic view illustrating the operation portion 15 and the display portion 12 disposed on a surface of the body case of the printer 10. The display portion 12 is constructed, for example, by a liquid crystal display to have two windows, i.e. a first display portion 21 and a second display portion 22 juxtaposed vertically. The second display portion 22 displays a path name 40 (an example of "position information") indicative of a position of a subject directory (hereinafter referred to as the "current directory") in the tree structure. The first display portion 21 displays, one by one, file names 41 of image data and/or directories, if any, in the current directory (an example of "designation information"). That is, the second display portion 22 displays the position information of the current directory, the contents of which are to be displayed on the first display portion 21.

The operation portion 15 is provided with an up/down switch 23 including an up key 23A and a down key 23B, an execute key 24, a cancel key 25, an advance key 26, and a back key 27. Note that for convenience of description, not only image data but also directories may be collectively referred to as "files."

4. Processing by the Control Portion

Figure 4:
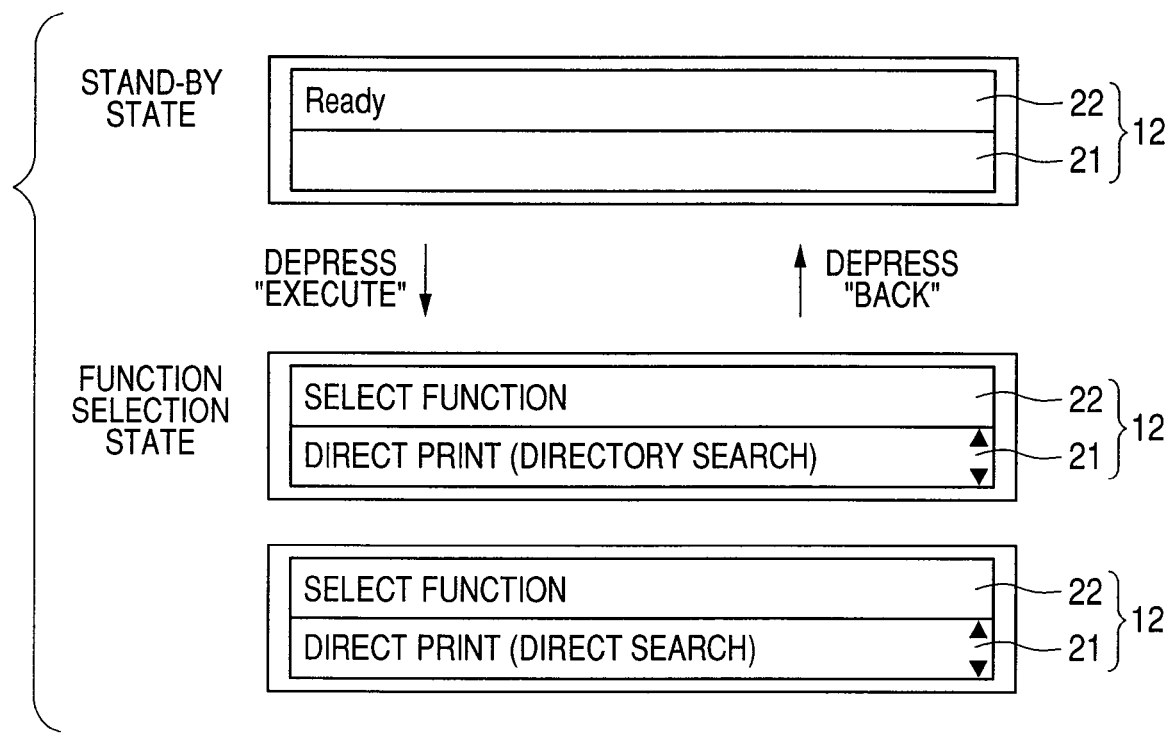
FIG. 4 is a schematic view illustrating displayed contents on the display portion (during a standby state and at the time of selecting a function).

As shown in FIG. 4, the control portion 14 displays a message "Ready" on the second display portion 22 but nothing on the first display portion 21 when a standby state for a user input is established, for example, after the printer 10 has been activated. When the execute key 24 is depressed in the standby state, the control portion 14 changes the display on the display portion 12 to a function selection screen. More specifically, for example, the second display portion 22 displays a message "Select a function." The first display portion 21 displays either "Direct printing (Directory search)" or "Direct printing (Direct search)," which can be selectively switched for display by operating the up/down switch 23. At this time, the operation portion 15 serves as a "second selection portion."

Here, the "Directory search" refers to a search function for finding desired image data while changing the current directory from an upper layer directory to a lower layer directory in the tree structure. The "Direct search" refers to a search function for one-dimensionally displaying all image data and directories stored in the USB memory 17 on the display portion 12 to directly find desired image data or a desired directory. The printer 10 of this embodiment can use the directory search and the direct search in order to find desired image data.

(1) Directory Search

Figure 5:
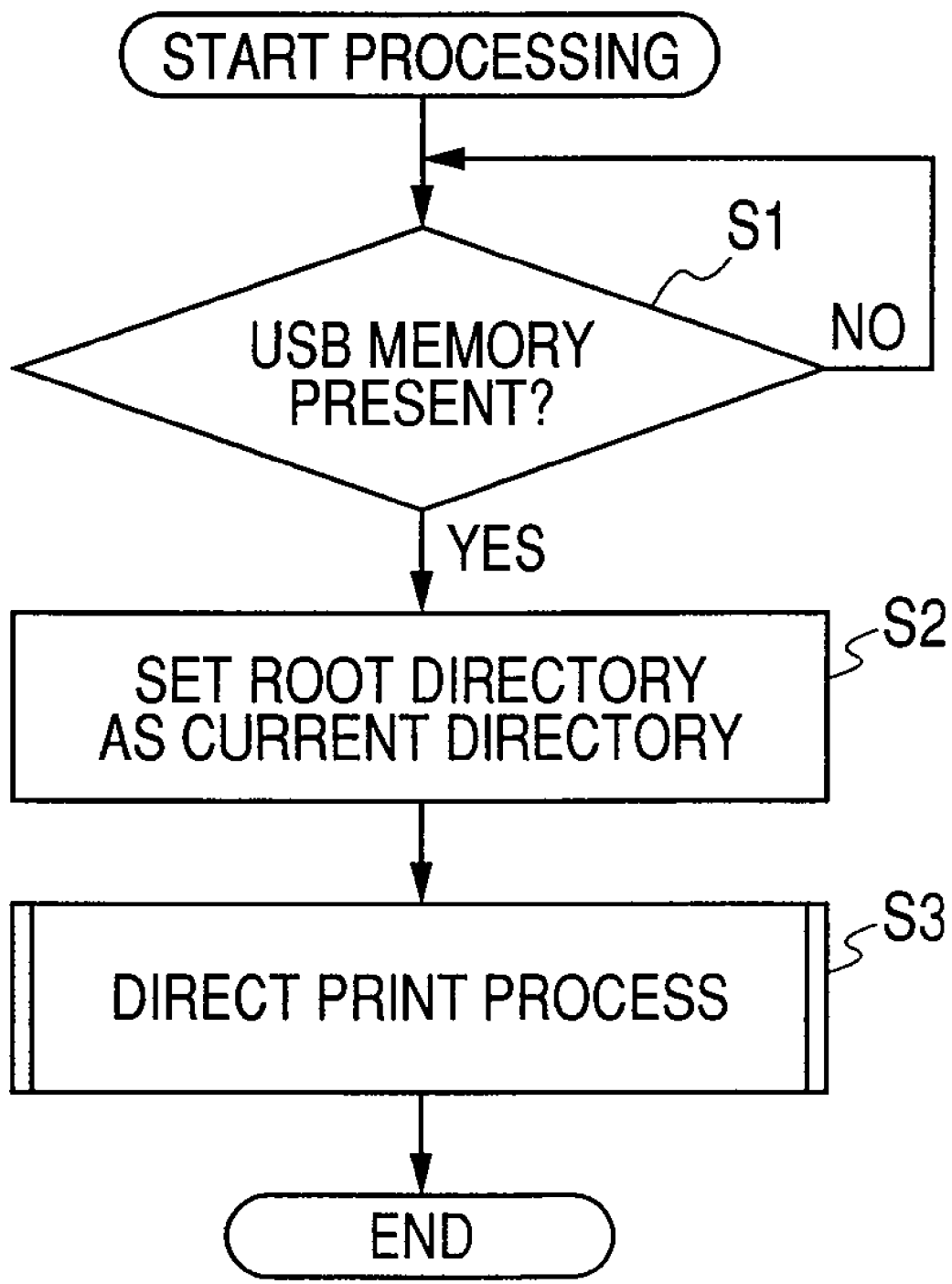
FIG. 5 is a flowchart showing a main routine of a directory search process.

When the execute key 24 is depressed with the message "Direct printing (Directory search)" displayed on the first display portion 21, the control portion 14 starts the directory search process shown in FIG. 5. First, for example, it is determined, in S1 based on a signal inputted to the USB host I/F 13, whether the USB memory 17 is mounted. If the USB memory 17 is mounted ("Y" in S1), then the ROOT directory 30 is set as the current directory in S2, and the direct printing process shown in FIG. 6 is started in S3.

[Direct Printing Process]

Figure 7:
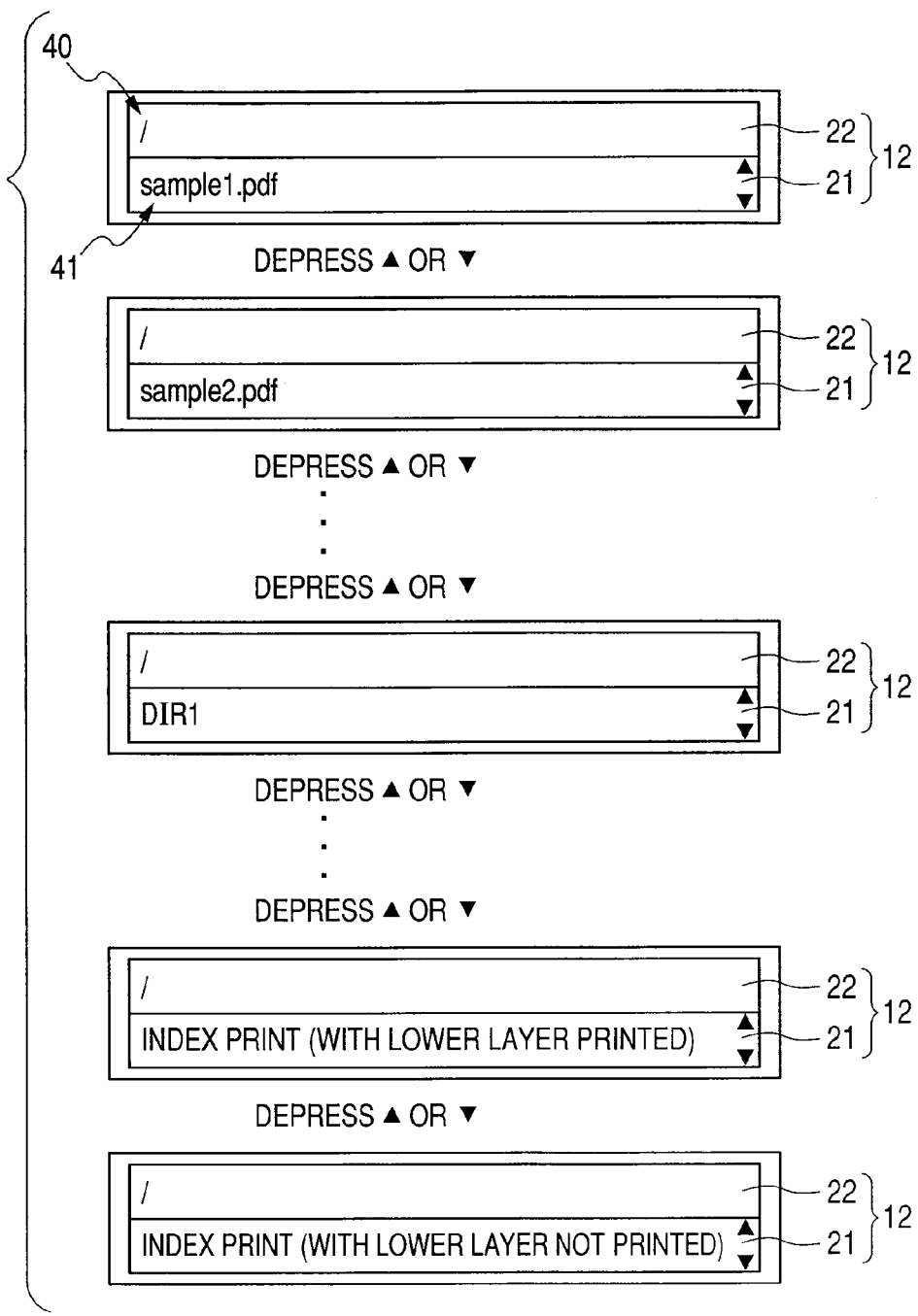
FIG. 7 is a schematic view illustrating a file designation window (root directory).

In S11, the control portion 14 displays, on the display portion 12, a file designation screen for designating image data or a sub-directory in the current directory as shown in FIG. 7. More specifically, the second display portion 22 displays the path name 40 ("/") of the current directory, i.e., the ROOT directory 30. The first display portion 21 displays one filename 41 ("DIR1", "sample1.pdf" or the like) of the sub-directory 31A, 31B and 31C and image data 32A, 32B . . . in the ROOT directory 30. Operating the up/down switch 23 will cause other filenames 41 to be sequentially scrolled one by one for display on the first display portion 21. In this embodiment, the first display portion 21 can display messages "Index printing (with a lower layer printed)" and "Index printing (with a lower layer not printed)" in addition to the filenames 41 as items that can be designated. By depressing the execute key 24 or the advance key 26, the file name or message currently displayed on the display portion 21 is designated. Accordingly, this file designation screen enables the user to designate a specific image data file and a specific sub-directory in the current directory as well as index printing of the current directory. Note that "with a lower layer printed or not printed" will be described later (see FIG. 9). At this time, the operation portion 15 serves as "Designation portion, the first selection portion."

Figure 6:
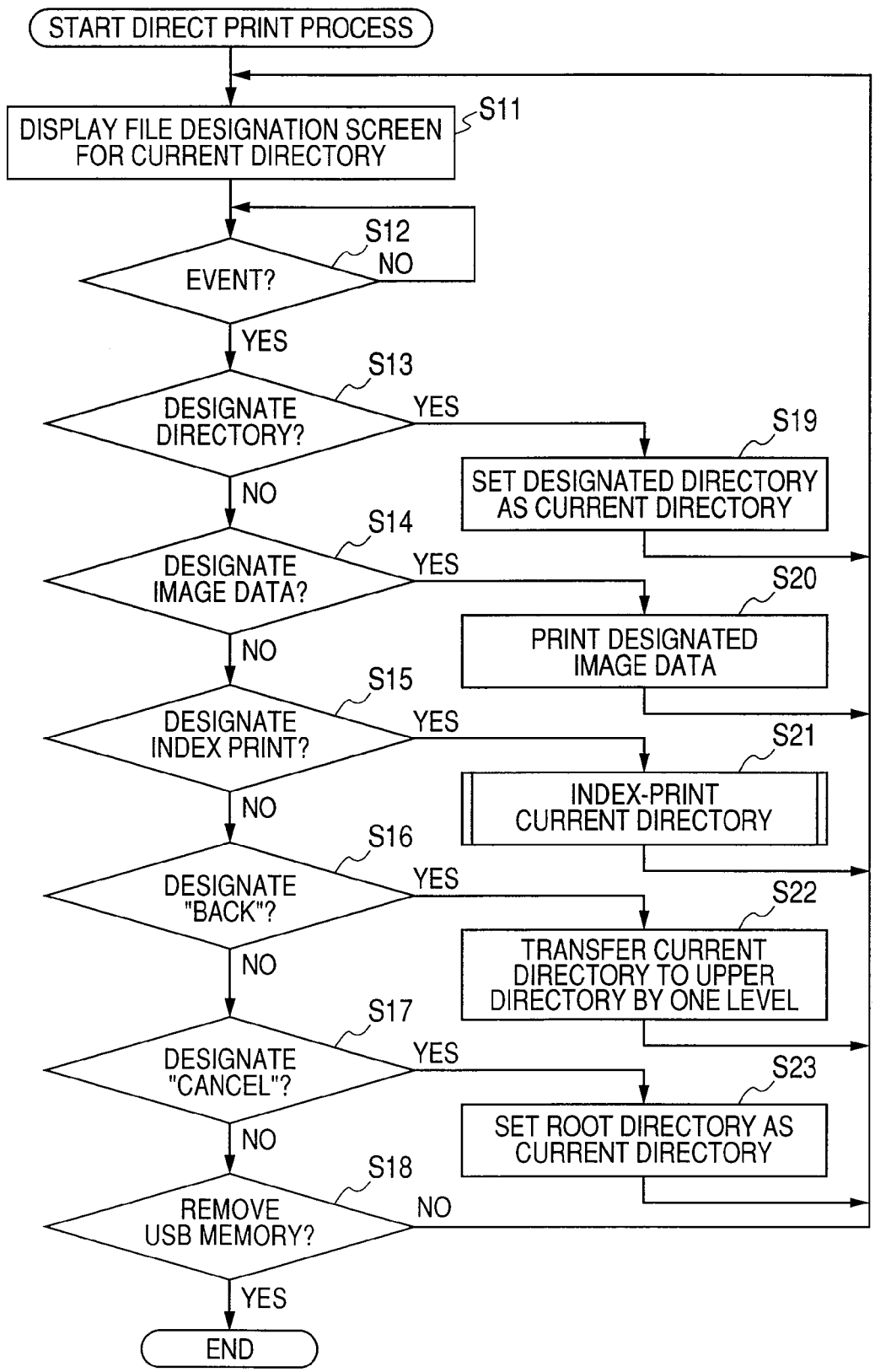
FIG. 6 is a flowchart showing a direct printing process.
Figure 8:
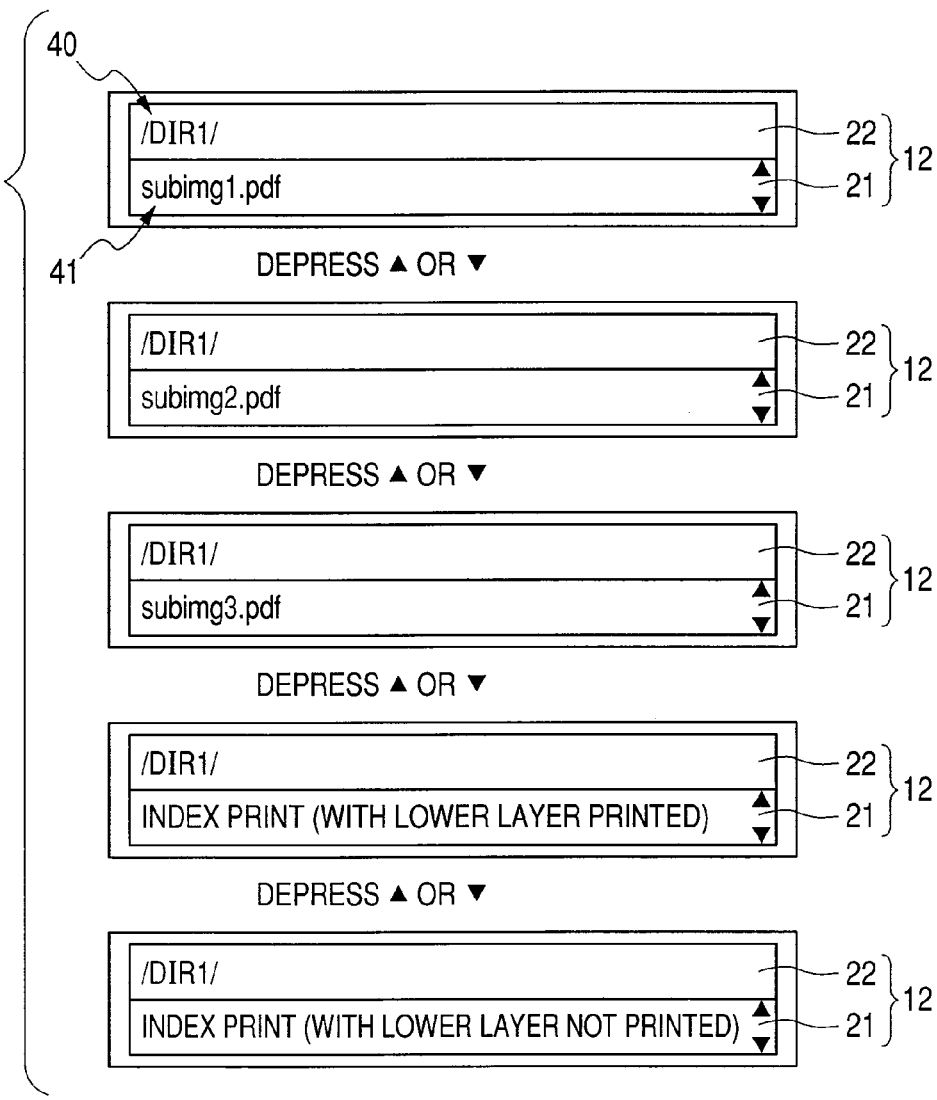
FIG. 8 is a schematic view illustrating a file designation window (sub-directory).

The control portion 14 determines in S12 of FIG. 6 whether the operation portion 15 has been operated. For example, if the sub-directory 31A was designated on the file designation screen ("Y" in S13), then in S19, the designated sub-directory 31A is set as the current directory. Then, the control portion 14 returns to S11, where as shown in FIG. 8, the file designation screen for the sub-directory 31A is displayed on the display portion 12. That is, the second display portion 22 displays the path name 40 ("/DIR1/") of the sub-directory 31A, and the first display portion 21 displays one filename 41 (such as "subimg1.pdf") of image data 33A, 33B and 33C in the sub-directory 31A. By operating the up/down switch 23, other filenames 41 of image data 33A, 33B and 33C are sequentially scrolled one by one for display on the first display portion 21.

Similarly to the file designation screen for the ROOT directory 30, the first display portion 21 can display messages "Index printing (with a lower layer printed)" and "Index printing (with a lower layer not printed)" in addition to the filenames 41 as items that can be designated. By depressing the execute key 24 or the advance key 26, the filename or message currently displayed on the first display portion 21 is designated. If a sub-directory is further stored in the sub-directory 31A, the first display portion 21 can display a filename 41 of the sub-directory as an item that can be designated in the file designation screen. If the current directory is an empty directory 31B or 31C, only its path name 40 is displayed on the second display portion 22, and no filename 41 is displayed on the first display portion 21.

When an image data file is designated on the file designation screen ("Y" in S14), the control portion 14 sends the designated image data file to the printing portion 11 in S20 to print the image on the sheet 19. Thereafter, the control portion 14 controls the display portion 12 to display the file designation screen for the directory in which the printed image data file is stored, i.e., the current directory (S11) for user's convenience. In this case, the file designation screen for the sub-directory 31A is displayed. Typically, after having printed a given image data file, the user may often want to continue to print other image data files which were categorized in the same manner as the printed image data file and thus stored in the same directory.

When the back key 27 is depressed on the file designation screen ("Y" in S16), the control portion 14 changes or transfers the current directory to a directory which is higher by one hierarchical level than the current directory in S22, and then controls the display portion 12 to display the file designation screen for the new current directory (S11). At this time, the operation portion 15 (the back key 27) serves as a "first transfer portion." On the other hand, when the cancel key 25 is depressed on the file designation screen ("Y" in S17), the control portion 14 changes or transfers the current directory to the uppermost ROOT directory 30 in S23, and then controls the display portion 12 to display the file designation screen for the ROOT directory 30 (S11). For example, suppose that the directory 31A has a sub-directory therein and the cancel key 25 is depressed with this sub-directory set as the current directory. In this case, the current directory is changed to the uppermost ROOT directory 30. At this time, the operation portion 15 (the cancel key 25) serves as a "second transfer portion." This enables a user to transfer the current directory to a desired directory with good operability. In addition, if the USB memory 17 is pulled out of the printer 10 with the file designation screen displayed ("Y" in S18), the direct printing process is exited, and then, for example, the standby window or function selection screen shown in FIG. 4 is displayed on the display portion 12.

[Index Printing Process]

Figure 9:
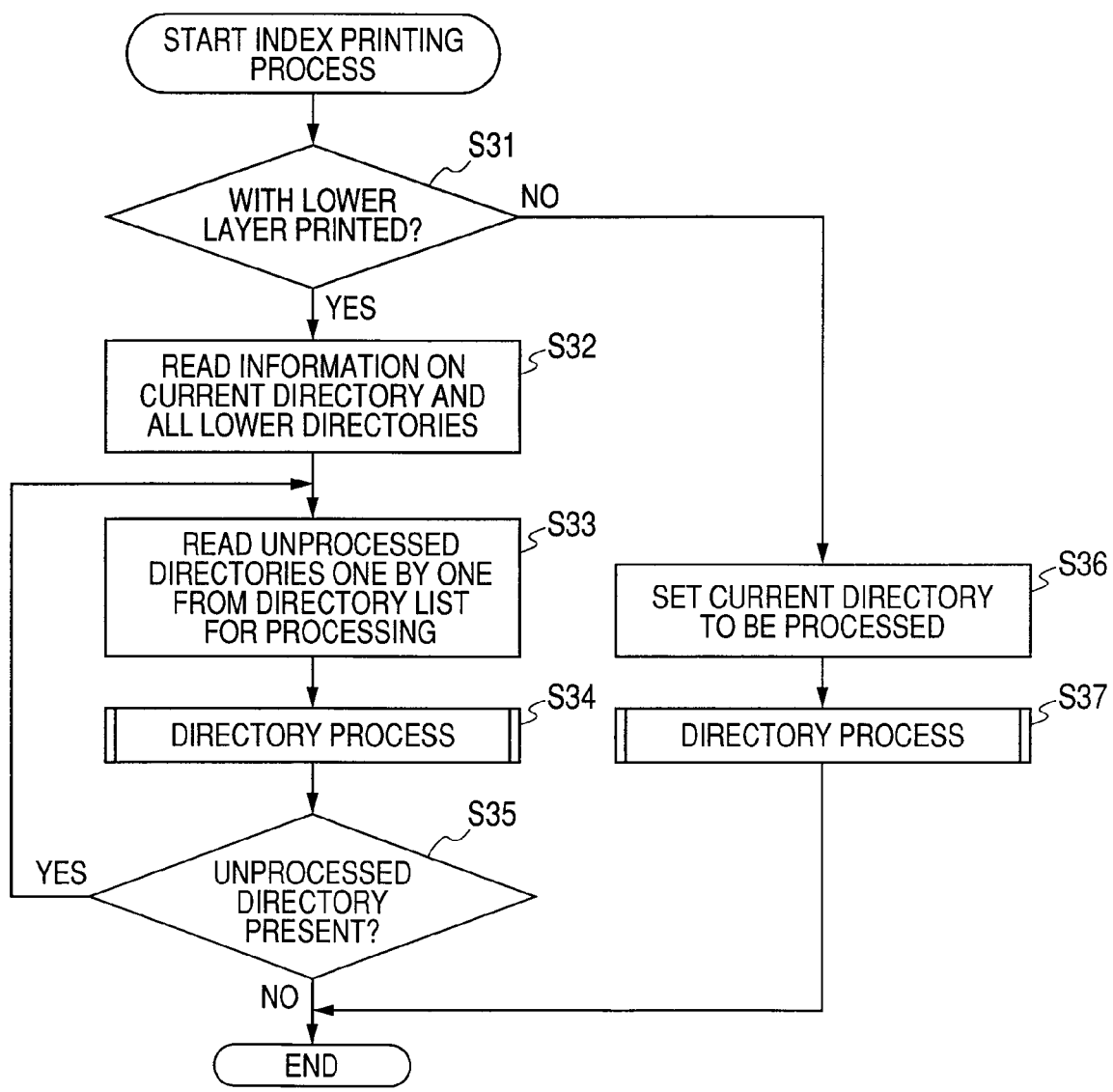
FIG. 9 is a flowchart showing an index printing process.

When index printing is designated on the file designation screen ("Y" in S15), the control portion 14 starts, in S21, the index printing process shown in FIG. 9 for the current directory. In S31, it is determined whether "with a lower layer printed" is designated (see FIG. 7 and FIG. 8). If "with a lower layer not printed" has been designated ("N" in S31), the control portion 14 starts the directory processing shown in FIG. 10 only on files present just in the current directory in S36 and S37. Namely, in S36, only the current directory is designated as a directory to be subjected to the directory processing.

On the other hand, if "with a lower layer printed" has been designated ("Y" in S31), then in S32, the control portion 14 reads information on the current directory and all sub-directories in the current directory from the USB memory 17 into a directory list. Then, the control portion 14 selects the directories, read into the directory list, sequentially one by one to be subjected to the directory processing (S33). That is, in S33, the current directory and all sub-directories in the current directory are designated as directories to be subjected to the directory processing. When the directory processing (S34) shown in FIG. 10 has been performed on all of the directories read into the directory list ("N" in S35), the index printing process is exited.

[Directory Processing]

Figure 10:
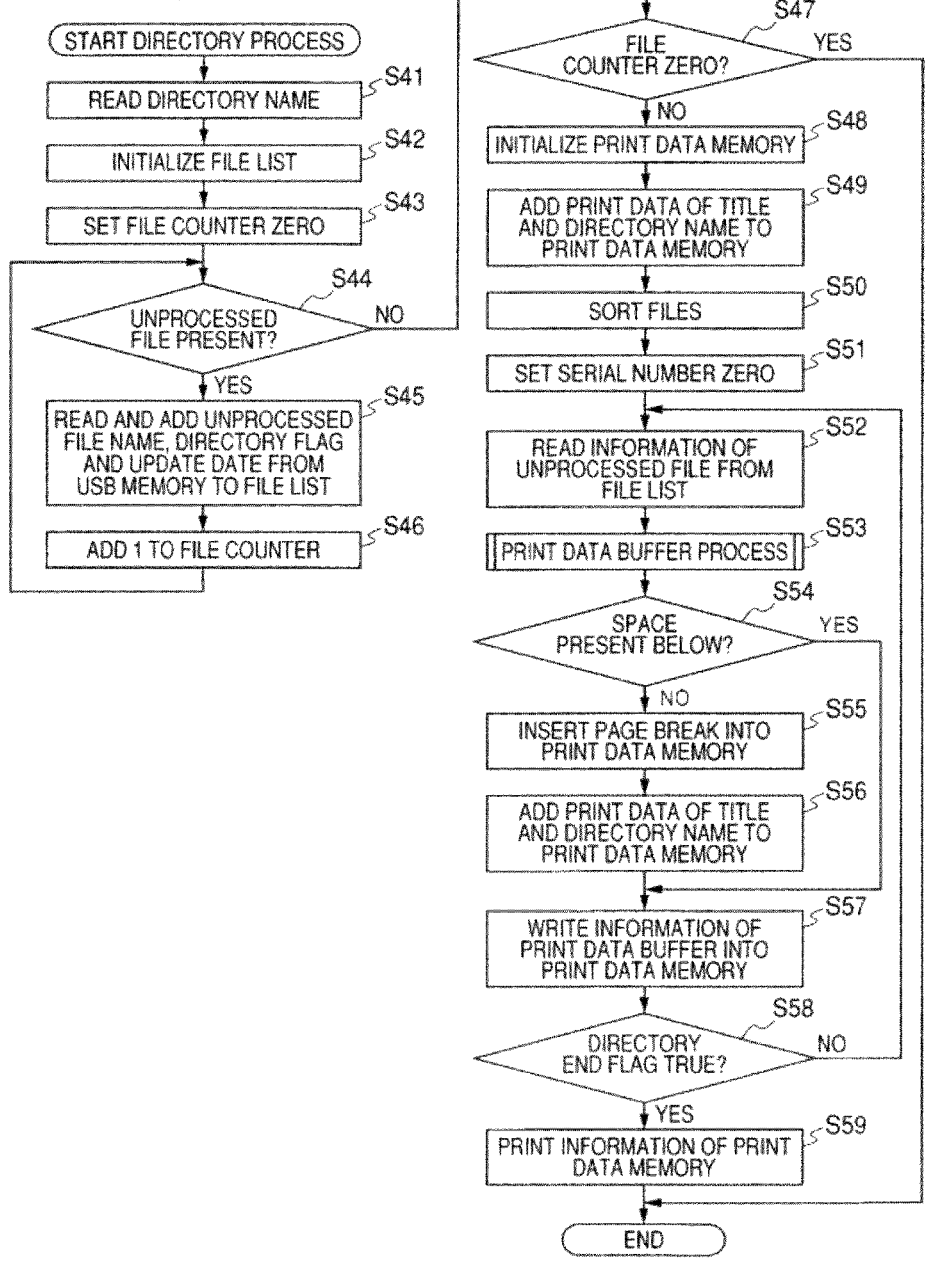
FIG. 10 is a flowchart showing a directory process.

As shown in FIG. 10, in S41, the control portion 14 reads a directory name of the directory or directory names of the directories designated by the processing in S36 or S33 to be subjected to the directory processing. In S42, the control portion 14 initializes a file list for storing information on image data present in the directories to be processed and information on the directories to be processed. In S43, the control portion 14 initializes, to zero, a file counter for counting the number of pieces of information in the file list. If there is a file in the directory being currently subjected to the directory processing and an unprocessed file remains therein ("Y" in S44), the control portion 14 reads, from the USB memory 17 in S45, the filename 41 of the unprocessed file, the directory name (directory flag) of the directory being currently subjected to the directory processing, and the update day of the unprocessed file, and adds those information to the file list. Then, the control portion 14 increments the file counter by one in S46.

When the file counter is zero in S47, i.e., when the directory being currently subjected to the directory processing is an empty directory 31B or 31C ("Y" in S47), the control portion 14 exits the directory processing, and then proceeds to S11 of FIG. 6 not to execute the index printing.

When the file counter is not zero ("N" in S47), in S48, the control portion 14 initializes a print data memory for storing print data for index printing in the internal memory 18. Then, in S49, the control portion 14 adds, to the print data memory, print data of a title "INDEX PRINT" and a directory name for printing on the sheet 19 (see FIG. 12 and FIG. 13). In S50, the control portion 14 sorts the image data names and directory names read into the file list according to a predetermined rule. For example, the sorting is conducted such that the group of directory names follows the group of image data names, and each of the groups of image data and directories is arranged as in the order in which they appear in dictionaries (e.g., in alphabetical order or in the order of 50 Japanese phonetic characters). The group of image data may follow the group of directories.

Figure 11:
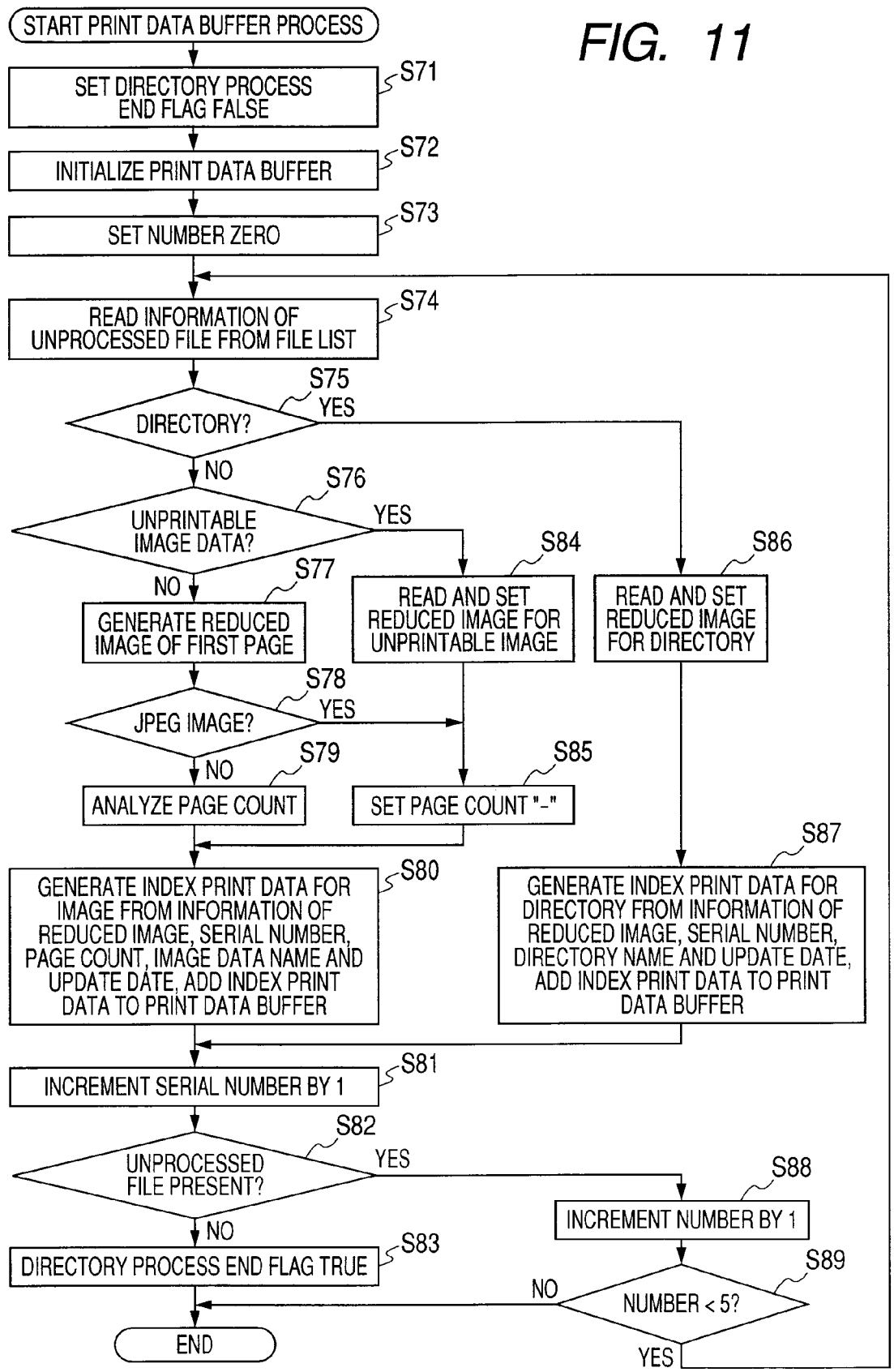
FIG. 11 is a flowchart showing a print data buffering process.

In S51, the control portion 14 initializes, to zero, the serial number that is sequentially given to the information in a directory, and reads the information of one unprocessed file from the file list, then starting in S53 the print data buffering process shown in FIG. 11. In S71, the control portion 14 changes, to False, the directory processing end flag which is ascertained as True when the processing of all image data or directories of the file list created by the processing of S45 is conducted. Then, in S72, the control portion 14 initializes a print data buffer in the internal memory 18 for storing a horizontal row of print data for index printing, and in S73, initializes the number of indexes stored in the print data buffer to zero. Then, in S74, the control portion 14 reads the information of one unprocessed file of the file list. If the read file is image data and is printable ("N" in S75 and "N" in S76), then in S77, the control portion 14 creates reduced image data of the head page of the image data. If the aforementioned image data can exist in plurality (e.g., text) ("N" in S78), then the page count is analyzed (S79), and the control portion 14 proceeds to S80.

On the other hand, if the image data cannot exist in plurality (e.g., a JPEG image) ("Y" in S78), then in S85, the control portion 14 changes the page count data to hyphen "-" data, and then proceeds to S80. Furthermore, if the image data is unprintable ("Y" in S76), then the control portion 14 employs image "?" data as reduced image data to indicate that the data is unprintable (S84), and changes the page count data to the hyphen "-" data in S85. Then, the control portion 14 proceeds to S80.

In S80, the control portion 14 creates index print data for the image data to be currently processed, from the information of the aforementioned reduced image data, serial number data, page count data, image data name data, and update day data, and then adds the index print data to the print data buffer.

If the file read in S74 is a directory ("Y" in S75), then in S86, the control portion 14 reads an image for the directory from the internal memory 18 and employs it as reduced image data. The control portion 14 creates index print data for the image data to be currently processed, from the information of the reduced image data, serial number data, directory name data, and update day data, and then adds the index print data to the print data buffer (S87).

In S81 after S80 and S87, the control portion 14 adds 1 to the serial number, and if there is no unprocessed file ("N" in S82), changes the directory processing end flag to True in S83 to exit the print data buffering process. If there is an unprocessed file ("Y" in S82), then in S88, the control portion 14 adds 1 to the count, and if this count is less than a number (e.g., five) that can be arranged in one row (in a horizontal row in this embodiment) on the sheet 19 ("Y" in S89), returns to S74. On the other hand, if the number of processed files is five ("N" in S89), then the control portion 14 exits the print data buffering process, and then proceeds to S54 of FIG. 10.

Then in S54, the control portion 14 determines whether the sheet 19 has a space left for printing of the print data that has been processed so far. If there is no space ("Y" in S54), then in S55, the control portion 14 inserts page break information into the print data memory, and then in S56, adds again the print data of the aforementioned title and directory name for the next sheet 19 to the print data memory. In S57, the control portion 14 writes the print data buffer information into the print data memory. On the other hand, if there is a space on the sheet 19 ("N" in S54), the control portion 14 simply proceeds to S57.

If the directory end flag is still False ("N" in S58), the control portion 14 returns to S52. If the directory end flag is True ("Y" in S58), then in S59, the control portion 14 sends the print data memory information to the printing portion 11 to execute the printing process.

Figure 12:
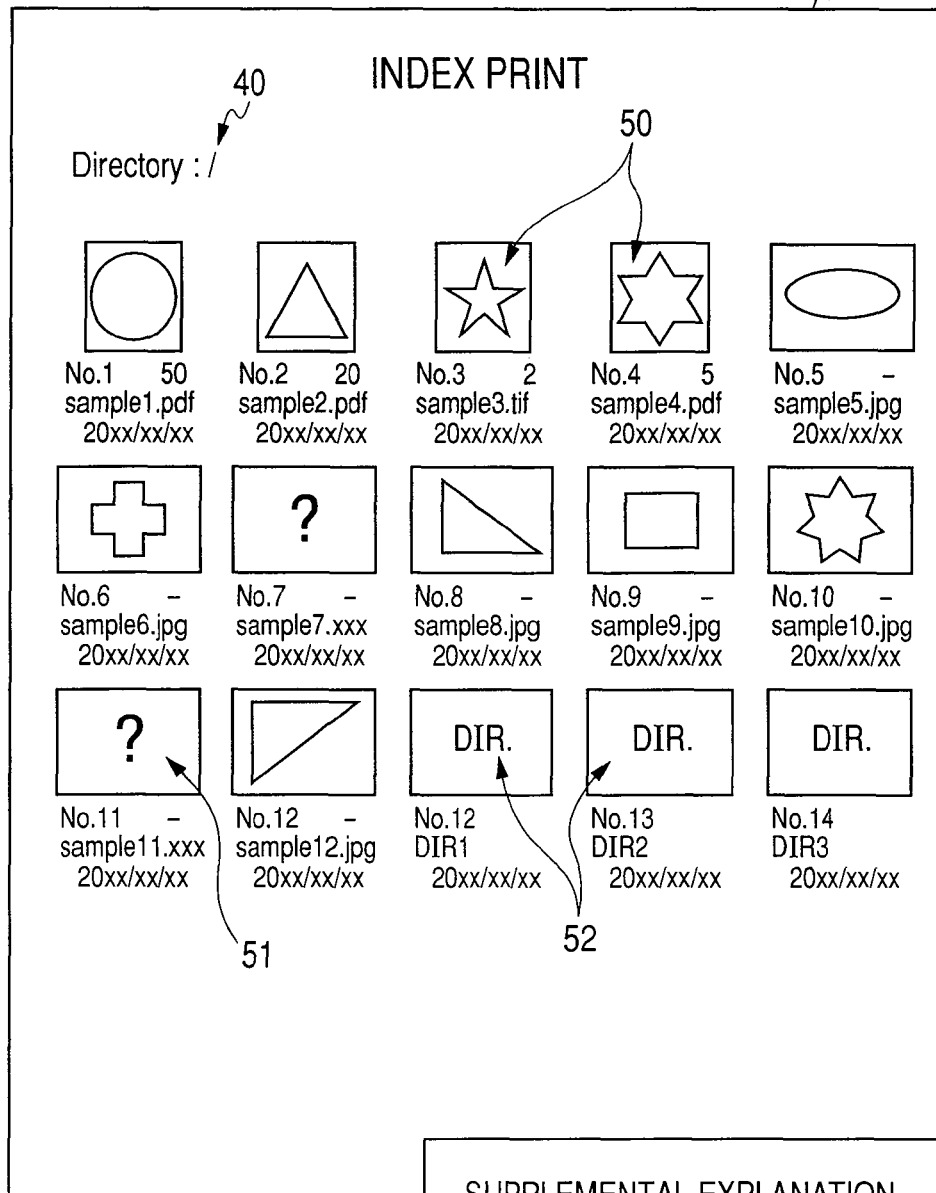
FIG. 12 is a schematic view illustrating printed contents of index printing (root directory).
Figure 13:
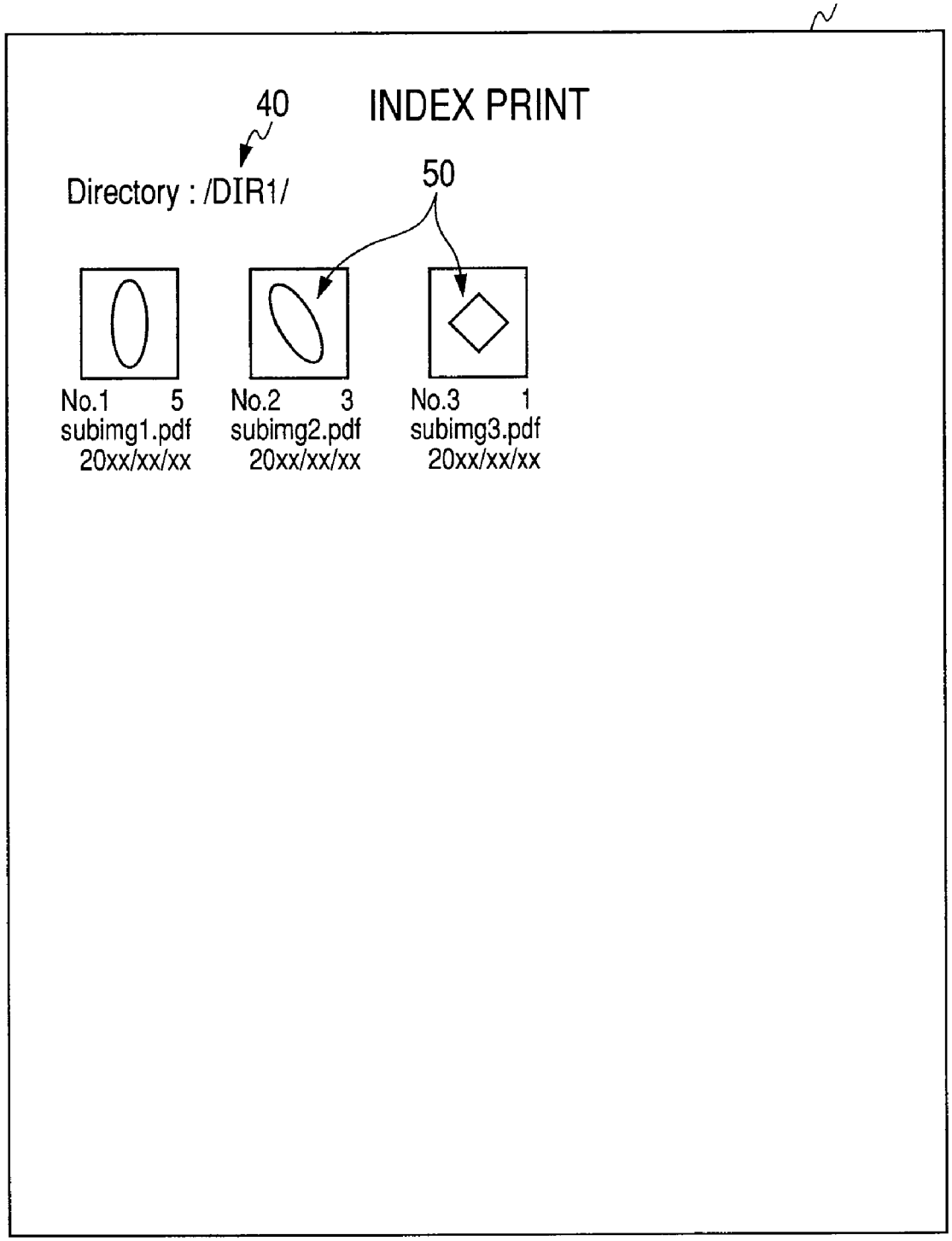
FIG. 13 is a schematic view illustrating printed contents of index printing (sub-directory).

The aforementioned index printing process allows the information as shown in FIG. 12 and FIG. 13 to be printed on the sheet 19. As shown in FIG. 12, when the ROOT directory 30 is index printed, the title "INDEX PRINT" is printed on the uppermost portion of the sheet 19. Below it, the path name 40 "/" of the ROOT directory 30 is printed, and further below it, pieces of information of images or sub-directories are printed five by five horizontally in a line. The information on each image includes a reduced image 50 of the head page of the image, the serial number, the total page count, the image data name, and the update day. In the case of unprintable image data, a reduced image 51 of "?" indicating the image being unprintable is printed, and "-" is printed as the total page count. On the other hand, if the image data is a JPEG image, "-" is also printed as the total page count.

The information on each directory includes a reduced image 52 displayed as "DIR" (an example of a "directory identification number"), the serial number, the directory name, and the update day. As shown in FIG. 13, when a sub-directory is index printed, the title "INDEX PRINT" is printed on the uppermost portion of the sheet 19 and below it, the path name 40 "/DIR1/" of the sub-directory is printed. Accordingly, by looking at the index printed sheet 19, the user can easily know the hierarchical level of the directory in which the desired image data is stored. In addition, the control portion 14 returns to S11 of FIG. 6 after the index printing is exited, and controls the display portion 12 to display the file designation screen for the directory subjected to the index printing, thereby making it possible to easily designate the desired image. Furthermore, if index printing (with a lower layer printed) is designated ("Y" in S31), then the processing in S32 to S34 can be repeated, thereby allowing for index printing of a hierarchically lower level directory of the designated directory.

(2) Direct Search

Figure 14:
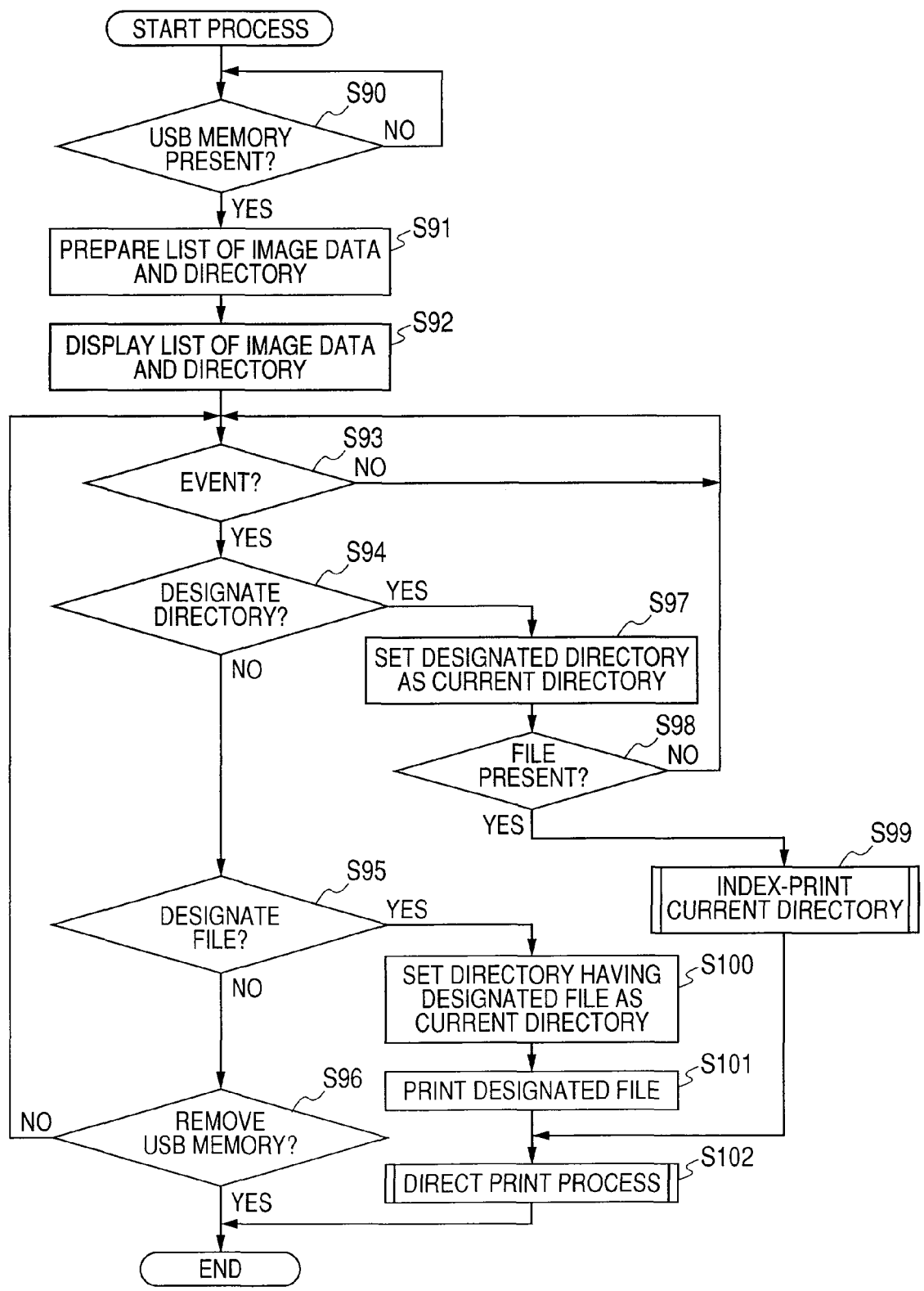
FIG. 14 is a flowchart showing a main routine of a direct search process.

When the execute key 24 is depressed with the message "Direct printing (direct search)" displayed on the first display portion 21, the control portion 14 starts the direct search process shown in FIG. 14. First, in S90, for example, the control portion 14 determines based on the signal inputted to the USB host I/F 13 whether the USB memory 17 is mounted. Then, if the USB memory 17 is mounted ("Y" in S90), then in S91, the control portion 14 creates a list of all one-dimensionally arranged image data and directories stored in the USB memory 17. Then in S92, in accordance with the list, the control portion 14 sets the filenames 41 of all image data and directories as displayed objects, and controls the display portion 12 to display those filenames 41 one-dimensionally, e.g., on the first display portion 21. That is, by operating the up/down switch 23, the filenames 41 of all image data and directories are scrolled sequentially one by one for display on the first display portion 21.

The control portion 14 determines in S93 whether the operation portion 15 has been operated. If one of the directories 30 and 31 is designated using the display of S92 (one-dimensional display screen) ("Y" in S94), then in S97, the control portion 14 sets the current directory as a designated directory. If the current directory has a file as in the case of the directories 30 and 31A ("Y" in S98), then in S99, the control portion 14 starts the index printing process discussed with reference to FIG. 9 to perform index printing of the current directory.

Thereafter, in S102, the control portion 14 proceeds to S11 of FIG. 6. That is, after index printing, the file designation screen for the index printed directory is displayed on the display portion 12 (see FIG. 7 and FIG. 8). Typically, by looking at the index printed sheet 19, the user may often want to print an enlarged version of a desired image found from the printed images on the sheet 19. Accordingly, as in this embodiment, after index printing, the file designation screen for the index printed directory is displayed on the display portion 12, thereby making it possible to designate and print desired image data with efficiency.

If the current directory is an empty directory (31B or 31C) ("N" in S98), the control portion 14 does not execute the index printing process and returns to the standby state of S93. This way, wasteful index printing, such as printing of only the title and the path name 40 on the sheet 19 with no images, can be eliminated.

If one of the image data 32 and 33 is designated using the one-dimensional display screen of S92 ("Y" in S95), then in S100, the control portion 14 sets the directory having the designated image data as the current directory, and controls the printing portion 11 to print the designated image data on the sheet 19 (S101).

Thereafter, in S102, the control portion 14 proceeds to S11 of FIG. 6. That is, after the image data designated by the direct search (e.g., the image data 33B) has been printed, the control portion 14 controls the display portion 12 to display the file designation screen for the directory 31A in which the printed image data 33B is stored (see FIG. 8). Typically, after having printed given image data, the user may desire to print other image data which was categorized in the same manner and stored in the same directory. Further, to know what is the image data which has been categorized in the same manner as the printed image data, the user may want to index print the directory in which the printed image data is stored. Accordingly, this display control is convenient for the user. If the USB memory 17 is pulled out of the printer 10 with the file designation screen being displayed ("Y" in S96), the direct search process is exited.

5. Effects of This Embodiment (1) According to this embodiment, when a specific directory is designated in accordance with the directory name of the directory displayed on the first display portion 21 provided on the printer 10, a hierarchically lower level directory stored in the designated directory, i.e., a sub-directory and image data are displayed. Accordingly, the user can know the hierarchical directory structure constructed in the USB memory 17 from the display on the first display portion 21, and thus easily designate a desired directory to perform index printing of the image data included therein. In addition, since the second display portion 22 displays the path name 40 of the current directory, the user can more easily know the hierarchical directory structure.

(2) On the file designation screen, the first display portion 21 displays an index printing command as a displayed object (an item to be designated) in addition the filenames 41 of a sub-directory and image data in the current directory. The user can issue the index printing command in the same manner as the designation of the sub-directory and image data. Furthermore, the user can select how the index printing is executed. That is, the user can selectively designate a first option (with a lower layer not printed) in which only a sub-directory lower by one hierarchical level than the current directory and image data in the current directory are printed and a second option (with a lower layer printed) in which image data in the sub-directory is also printed in addition to the first option.

(3) If the current directory is an empty directory (31B or 31C), then the process returns to a standby state without performing the index printing process. It is thus possible to eliminate wasteful index printing, for example, printing only the title or the path name 40 on the sheet 19 with no images.

(4) When a desired directory name or image data name is known in advance, the desired directory or the like may be more easily designated by the direct search function rather than by the directory search function. In this regard, both search functions are made selectively available.

<Other Embodiments>

The present invention is not limited to the embodiment that has been described above with reference to the drawings, for example, the following embodiments may also fall within the technical scope of the present invention.

(1) The aforementioned embodiment employed the USB memory 17 as an example of a storage medium. However, the present invention is not limited thereto. The storage medium may be a memory card such as a compact flash (trade mark), smart media (trade mark), or a memory stick (trade mark). Alternatively, without being limited to such an external memory, it is also possible to employ an internal memory 18 that is incorporated in the printer 10. Further, an internal memory that is incorporated in a digital camera, a video camera, a cellular phone or the like connectable to and communicatable with the printer 10 may be used as a storage medium according to the present invention.

(2) The aforementioned embodiment is configured such that the directory name of a sub-directory in the current directory and an image data name are displayed as a designatable object on the first display portion 21 of the file designation screen; however, the present invention is not limited thereto. Only the directory name of a sub-directory may also be displayed as a designatable object. However, such a configuration as that of the aforementioned embodiment in which the image data name is also displayed as a designatable object would make it possible to directly command the printing of desired image data using the file designation screen.

(3) In the aforementioned embodiment, the display portion 12 displays filenames of image data and/or directories one by one; however, the present invention is not limited thereto. A plurality of filenames may also be concurrently displayed depending on the size of the display.

The present invention provides illustrative, non-limiting embodiments as follows:

(1) An image forming apparatus includes a display portion for displaying designation information corresponding to a directory present at a level on a storage medium in which a plurality of directories are stored hierarchically; a designation portion for designating a directory in accordance with the designation information displayed on the display portion; a display control portion for displaying on the display portion, when a directory is designated at the designation portion, designation information corresponding to a lower layer directory present in the designated directory; and a printing portion for index printing, on a print medium, an image present in the directory corresponding to the designation information displayed on the display portion.

The "image forming apparatus" may be not only a printing apparatus such as a printer (e.g., a laser printer) but also a facsimile machine or a multi-function machine provided with a printing function, a reading function (scanner function), etc.

The "print medium" may not be limited to a paper print medium such as a sheet but may also be a plastic print medium such as an OHP sheet.

(2) In the image forming apparatus according to (1), the display portion comprises a first display portion and a second display portion, and the display control portion displays the designation information corresponding to the directory on the first display portion, and displays position information indicating a hierarchical position of the directory on the second display portion.

(3) In the image forming apparatus according to (1) or (2), the display control portion displays designation information corresponding to an image in the designated directory on the display portion in addition to the lower layer directory.

(4) In the image forming apparatus according to any one of (1) to (3), the storage medium is an external memory removably attached to the apparatus body.

(5) In the image forming apparatus according to any one of (1) to (4), the display control portion displays instruction information for instructing index printing of the designated directory on the display portion.

(6) In the image forming apparatus according to any one of (1) to (5), the printing portion prints the position information indicating the hierarchical position of an index printed directory and the image on the same print medium.

(7) In the image forming apparatus according to any one of (1) to (6), the printing portion prints, on the print medium, an image in an index printed directory as well as identification information in a lower layer directory within the directory.

(8) In the image forming apparatus according to any one of (1) to (7), the printing portion index prints, on the print medium, an image in the index printed directory as well as an image in a lower layer directory stored in the directory.

(9) The image forming apparatus according to (8) further includes a first selection portion for allowing a user to operatively select whether to print an image in the lower layer directory upon the index printing. The printing portion executes index printing in response to the selection made at the first selection portion.

(10) The image forming apparatus according to any one of (1) to (9) further includes a first transfer portion for inputting a transfer instruction. The display control portion transfers a displayed object on the display portion from the currently displayed directory to a directory higher by one level in accordance with a transfer instruction from the first transfer portion.

(11) The image forming apparatus according to any one of (1) to (10) further includes a second transfer portion for inputting a transfer instruction. The display control portion transfers a displayed object on the display portion to the uppermost directory in accordance with a transfer instruction from the second transfer portion.

(12) In the image forming apparatus according to any one of (1) to (11), in the absence of information in the designated directory, the printing portion does not execute index printing on the print medium.

(13) The image forming apparatus according to any one of (1) to (12) further includes a second selection portion for selecting to make at least either a directory search or a direct search. The display control portion displays, on the display portion, designation information corresponding only to information in the currently designated directory if the directory search is selected at the second selection portion. The display control portion displays, on the display portion, designation information corresponding to all information stored in the storage medium if the direct search is selected.

According to the configuration of (1), when a specific directory is designated in accordance with the designation information of the directory displayed on the display portion provided in the image forming apparatus, a lower layer directory stored in the designated directory, i.e., a sub-directory is displayed. Accordingly, the user can know the hierarchical directory structure constructed on the storage medium from the display on the display portion and easily designate the directory to be index printed, thereby index-printing an image that is included therein.

According to the configuration of (2), position information (e.g., path name) indicating the hierarchical position of an upper layer directory for storing a directory for which designation information is currently displayed is displayed on the display portion, thereby allowing the user to more easily know the hierarchical directory structure according to the configuration of (3), it is possible to check, on the display portion, not only a lower layer directory present in the designated directory but also designation information corresponding to an image present in the designated directory. This allows for easily finding a directory which includes a desired image.

According to the configuration of (4), the present invention is particularly effective because an external memory has a higher storage capacity than an internal memory, and a complicated hierarchical structure is more likely constructed.

According to the configuration of (5), index printing can be directed in the same manner as a designated directory, thereby providing an improved operability.

According to the configuration of (6), by looking at the index printed print medium, it can be easily known where the index printed directory is located in the hierarchical structure.

According to the configuration of (7), it is possible to easily know not only an image stored in a designated directory but also the presence or absence of a lower layer directory by looking at the index printed print medium.

According to the configurations of (8) and (9), it is possible to check not only an image stored in the designated directory but also an image stored in a lower layer directory by looking at the index printed print medium. It is also desirable to be able to select whether to print an image in a lower layer directory.

According to the configurations of (10) and (11), a displayed object on the display portion can be transferred to an-upper directory of the currently displayed directory or to the uppermost directory. It is thus possible to designate a directory to be index printed with good operability.

According to the configuration of (12), it is possible to prevent unnecessary index printing of a designated directory in which no information (an image or a directory) is stored.

According to the configuration of (13), it is possible to select the directory search and the direct designation. With either one selected, the configuration according to each of the claims above makes it possible to efficiently perform index printing.

What is claimed is:

1. An image forming apparatus that is configured to read data from a storage medium having hierarchically structured directories including a first directory, a second directory which is stored in the first directory and a third directory which is stored in the second directory, the apparatus comprising:
    a display portion that displays designation information of the first directory, the display portion configured to display only character strings and including a first display portion and a second display portion, the second display portion being sized to display only a one line character string;
    an operation portion configured to receive a designation of the second directory based on the first directory designation information displayed on the first display portion;
    a display control portion that controls the display portion to display designation information of the second directory when the second directory is designated and controls the display portion to display the designation information on the first display portion and position information on the second display portion, the position information indicative of a hierarchical position of the second directory, the designation information of which is currently displayed on the first display portion; and
    a printing portion that index-prints images on a print medium based on files stored in one of the first, second and third directories, the position information of which is currently displayed on the second display portion,
    wherein the printing portion is configured to print images on the print medium including first images based on image files stored in the first directory, second images based on image files stored in the second directory and third images based on image files stored in the third directory when the position information of the first directory is currently displayed on the second display portion.

2. The image forming apparatus according to claim 1, wherein the files include image files stored in the one of the first and second directories, the position information of which is currently displayed on the second display portion.

3. The image forming apparatus according to claim 2, wherein the files include the second directory when the position information of the first directory is currently displayed on the second display portion.

4. The image forming apparatus according to claim 1, further comprising:
    an interface configured to removably receive the storage medium in the form of an external memory.

5. The image forming apparatus according to claim 1, wherein the display control portion controls the first display portion to display instruction information for instructing index printing of the directory, the position information of which is currently displayed on the second display portion.

6. The image forming apparatus according to claim 1, wherein the printing portion prints the images and position information indicative of a hierarchical position of the one directory on the same print medium.

7. The image forming apparatus according to claim 1, wherein the images to be printed by the printing portion on the print medium when the position information of the first directory is currently displayed on the second display portion includes images based on image files stored in the first directory and identification information of the second directory.

8. The image forming apparatus according to claim 1, wherein
the operation portion allows a user to operatively select whether to print the second images and the third images, and
the printing portion selectively index-prints all of the first, second and third images or the first images depending on user's selection via the operation portion.

9. The image forming apparatus according to claim 1, wherein:
the operation portion is configured to receive a transfer instruction as an input;
when the designation information of the first directory is currently displayed on the first display portion, the display control portion controls the display portion to display information indicative of the files stored in the first directory as the designation information of the first directory; and
when the transfer instruction is inputted in a state in which the designation information of the first directory is currently displayed on the display portion, the display control portion controls the display portion to display information indicative of files stored in a third directory as the designation information of the third directory, the third directory being one hierarchical level higher than the first directory.

10. The image forming apparatus according to claim 1, wherein
the operation portion is configured to receive a transfer instruction as an input;
when the designation information of the second directory is currently displayed on the display portion, the display control portion controls the display portion to display information indicative of the files stored in the second directory as the designation information of the second directory; and
when the transfer instruction is inputted in a state in which the designation information of the second directory is currently displayed on the display portion, the display control portion controls the display portion to display information indicative of files stored in a fourth directory as the designation information of the fourth directory, the fourth directory being an uppermost directory among the hierarchically structured directories in the storage medium.

11. The image forming apparatus according to claim 1, wherein if the directory, the position information of which is currently displayed on the second display portion, has no information, the printing portion does not execute index printing on the print medium.

12. The image forming apparatus according to claim 1, wherein
the operation portion allows at least either a directory search or a direct search to be selected, and
the display control portion controls the display portion to display designation information corresponding only to information stored in the currently designated directory if the directory search is selected via the operation portion, and controls the display portion to display designation information corresponding to all information stored in the storage medium if the direct search is selected via the operation portion.

13. The image forming apparatus according to claim 1, wherein the printing portion index-prints the first images on a first print medium, the second images on a second print medium and the third images on a third print medium.

14. The image forming apparatus according to claim 1, wherein the image to be printed by the printing portion on the print medium when the position information of the second directory is currently displayed on the second display portion includes the second images based on the image files stored in the second directory and the third images based on the image files stored in the third directory.

15. An image forming apparatus that is configured to read data from a storage medium having hierarchically structured directories including first, second and third directories, the first directory storing first image files and the second directory therein, the second directory storing second image files and the third directory therein and being one hierarchical level lower than the first directory, and the third directory storing third image files and being one hierarchical level lower than the second directory, the apparatus comprising:
a display configured to display only character strings and including a first display portion and a second display portion, the second display portion being sized to display only a one line character string;
an input unit;
a print unit;
a display controller which controls the display:
(1) to display a function selection screen on the first display portion when a predetermined condition is met, the function selection screen indicating selectable options including a directory search;
(2) to display a file designation screen for a current directory on the second display portion in response to a command indicative of selection of the directory search by a user using the function selection screen, the file designation screen indicating items that can be selectively designated by the user using the file designation screen for the current directory;
(3) to display information identifying the first image files and information identifying the second directory as items in the file designation screen for the first directory in response to a command indicating that the first directory is designated as the current directory by the user using the input unit; and
(4) to display information identifying the second image files as items in the file designation screen for the second directory in response to a command indicating that the second directory is designated as the current directory by the user using the input unit; and
a print controller which controls the print unit to print reduced images respectively representing the first image files, the second image files and the third image files when the index printing is designated by the user using the input unit and the file designation screen for the first directory.

16. The image forming apparatus according to claim 15, wherein the display controller controls the display to display index printing as one of the selectively designatable options using the file designation screen for the current directory.

17. The image forming apparatus according to claim 16, wherein the print controller controls the print unit to
    print reduced images respectively representing the second image files and the third image files when the index printing is designated by the user using the input unit and the file designation screen for the second directory.

18. The image forming apparatus according to claim 15, wherein the print controller controls the print unit to
    print the reduced image representing the first image files on a first print medium,
    print the reduced image representing the second image files on a second print medium, and
    print the reduced image representing the third image files on a third print medium.

* * * * *